(12) United States Patent
Kwon et al.

(10) Patent No.: US 10,284,890 B2
(45) Date of Patent: May 7, 2019

(54) SHVC-BASED UHD IMAGE DATA TRANSMISSION AND RECEPTION SYSTEM

(71) Applicant: Korea Electronics Technology Institute, Seongnam-si, Gyeonggi-do (KR)

(72) Inventors: Ki Won Kwon, Seongnam-si (KR); Won Gi Jeon, Yongin-si (KR); Yong Hwan Kim, Anyang-si (KR); Kyung Won Park, Seoul (KR)

(73) Assignee: KOREA ELECTRONICS TECHNOLOGY INSTITUTE, Seongnam-si, Gyeonggi-do (KR)

( * ) Notice: Subject to any disclaimer, the term of this patent is extended or adjusted under 35 U.S.C. 154(b) by 0 days.

(21) Appl. No.: 15/436,578

(22) Filed: Feb. 17, 2017

(65) Prior Publication Data

US 2017/0171583 A1    Jun. 15, 2017

Related U.S. Application Data

(63) Continuation of application No. PCT/KR2015/006870, filed on Jul. 3, 2015.

(30) Foreign Application Priority Data

Aug. 20, 2014    (KR) .................. 10-2014-0108506

(51) Int. Cl.
| | | |
|---|---|---|
| *H04N 7/173* | (2011.01) | |
| *H04N 21/2665* | (2011.01) | |
| *H04N 7/015* | (2006.01) | |
| *H04N 19/30* | (2014.01) | |
| *H04N 19/44* | (2014.01) | |
| *H04N 21/235* | (2011.01) | |

(Continued)

(52) U.S. Cl.
CPC ......... *H04N 21/2665* (2013.01); *H04N 7/015* (2013.01); *H04N 19/30* (2014.11);
(Continued)

(58) Field of Classification Search
CPC ............... H04N 21/2665; H04N 19/30; H04N 21/2353; H04N 21/435; H04N 21/44016; H04N 21/816; H04N 19/44
(Continued)

(56) References Cited

U.S. PATENT DOCUMENTS

| 9,554,162 B2 * | 1/2017 | Hwang ............... H04N 21/2662 |
| 2008/0046942 A1 * | 2/2008 | Merlin ............... H04N 21/4316 725/110 |

(Continued)

FOREIGN PATENT DOCUMENTS

| KR | 10-2012-0012089 A | 2/2012 |
| KR | 10-2012-0107882 A | 10/2012 |

(Continued)

OTHER PUBLICATIONS

Kim et al., "Cable UHDTV Broadcast Technology Trend," *Journal of Korea Communication*, Apr. 2013, pp. 18-26.
(Continued)

*Primary Examiner* — Nnenna N Ekpo
(74) *Attorney, Agent, or Firm* — Knobbe Martens Olson & Bear LLP

(57) ABSTRACT

The described technology generally relates to a scalable high efficiency video coding (SHVC)-based ultra-high definition (UHD) image data transmission and reception system. The SHVC-based UHD image data transmission and reception system includes an image data collector configured to collect various kinds of image data and additional data of the image data. The system also includes an image data coder configured to code the image data and the additional data by using an HEVC-based scalable video coding scheme, and an image data transmitter configured to transmit at least one of a portion of the coded image data and the coded additional data to a terminal via a communication network.

4 Claims, 5 Drawing Sheets

(51) Int. Cl.
    *H04N 21/435*   (2011.01)
    *H04N 21/44*   (2011.01)
    *H04N 21/81*   (2011.01)
    *H04N 21/2343*   (2011.01)
    *H04N 21/462*   (2011.01)

(52) U.S. Cl.
    CPC ......... *H04N 19/44* (2014.11); *H04N 21/2353* (2013.01); *H04N 21/234327* (2013.01); *H04N 21/435* (2013.01); *H04N 21/44016* (2013.01); *H04N 21/4622* (2013.01); *H04N 21/816* (2013.01)

(58) Field of Classification Search
    USPC .................................................. 725/116, 118
    See application file for complete search history.

(56) References Cited

U.S. PATENT DOCUMENTS

2013/0174209 A1*   7/2013   Jung ...................... H04N 21/00
    725/118
2013/0307942 A1*   11/2013   Dini ................... H04N 5/44591
    348/51
2013/0346566 A1*   12/2013   Kwon ................ H04N 21/4622
    709/219
2014/0215547 A1*   7/2014   Lee ...................... H04N 21/631
    725/126
2014/0226710 A1   8/2014   Park et al.
2014/0253814 A1*   9/2014   Kondo ............. H04N 21/42218
    348/734

FOREIGN PATENT DOCUMENTS

KR     10-2013-0011994 A     1/2013
KR     10-2013-0078319 A     7/2013

OTHER PUBLICATIONS

Office Action dated Mar. 14, 2016 in corresponding Korean Application No. 10-2014-0108506, filed Aug. 20, 2014.
International Search Report dated Oct. 28, 2015 in corresponding International Application No. PCT/KR2015/006870, filed Jul. 3, 2015.

* cited by examiner

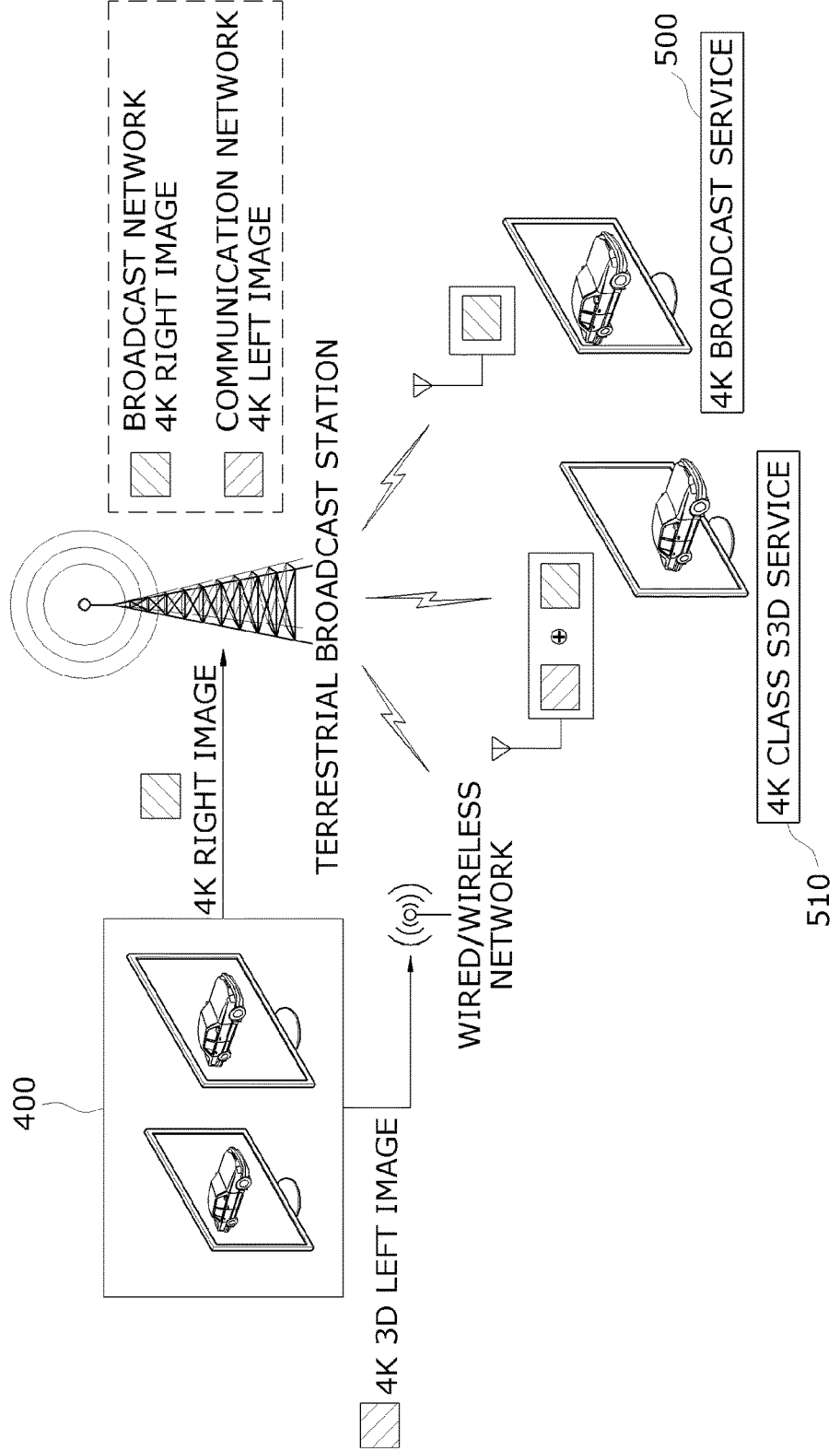

SHVC-BASED UHD IMAGE DATA TRANSMISSION AND RECEPTION SYSTEM

CROSS-REFERENCE TO RELATED APPLICATIONS

This application is a continuation application, and claims the benefit under 35 U.S.C. §§ 120 and 365 of PCT Application No. PCT/KR2015/006870, filed on Jul. 3, 2015, which is hereby incorporated by reference. PCT/KR2015/006870 also claimed priority from Korean Patent Application No. 10-2014-0108506 filed on Aug. 20, 2014, which is hereby incorporated by reference.

BACKGROUND

Field

The described technology generally relates to a system for transmitting and receiving image data, and more particularly, to a system for transmitting and receiving various kinds of image data including ultra-high definition (UHD) image data.

Description of the Related Technology

A mobile broadcast service which is low in resolution needs a high definition (HD) class broadcast service, and moreover, requirements for a full HD. UHD (4K, 8K, etc.) broadcast service are rapidly increasing. Therefore, requirements for technology that efficiently transmits and receives broadcast data in a fixed environment and a mobile environment are increasing.

In particular, UHD televisions (TVs) are attracting attention as a next generation broadcast service that provides a multichannel (ten or more channels) audio service and a UHD image service for providing image quality which is four to sixteen times sharper than image quality provided by HD TVs. However, in current domestic UHD TV technology, development of relevant apparatuses other than display devices of UHD TVs is inadequate.

Moreover, technology for coding UHD image data is in a state where after high efficiency video coding (HEVC) which is standard technology is finished in 2013, a formal coding product to which HEVC technology is capable of being applied is not developed.

The HEVC is next-generation image compression technology which has a compression rate higher than and a complexity lower than H.264/AVC technology, and is attracting attention as core technology for effectively compressing massive data of an HD class image and an UHD class image.

The HEVC performs block-unit coding like conventional compression standards. However, since there is only one profile, the HEVC has a difference with H.264/AVC. Core coding technology included in the one profile of the HEVC includes hierarchical coding structure technology, conversion technology, quantization technology, in-screen prediction coding technology, inter-screen motion prediction technology, entropy coding technology, loop filter technology, and other technologies in a total of eight fields.

Table 1 shows the international standard history of scalable video coding (SVC) technology such as the HEVC.

TABLE 1

| SVC standard | Year | Standard Organization | Adoption in Industry |
|---|---|---|---|
| MPEG-2 Video, H.262 | 1996 | ISO/IEC MPEG, ITU-T VCEG | Hardly |
| MPEG-4 Visual | 1999, 2002 | ISO/IEC MPEG | Hardly |
| H.264/AVC | 2007 | ISO/IEC MPEG, ITU-T VCEG | Video conference system, image security system, etc. |
| HEVC | 2014 | ISO/IEC MPEG, ITU-T VCEG | Still unsettled |

As shown in Table 1, current HEVC scalable extension is fourth SVC codec standard and has been standardized in July, 2014. Since the HEVC scalable extension needs a correction of a standard document and a reference SW bug and a codec implementation process in industry, it is predicted that the HEVC scalable extension is to be actually used from 2016. Since previous three-time SVC codec is not actively used in industry, standardization has been made for overcoming a failure of conventional SVC standard. In comparison with the H.264/AVC, a high implementation complexity of the SVC standard is determined as a cause of an adoption rate which is low in industry, and the HEVC scalable extension has minimized an implementation complexity.

In this case, the SVC denotes a complex bitstream image where various kinds of images are included in one bitstream, and may provide an image service in various networks and dissimilar terminal environments by compressing various kinds of images into one complex bitstream.

However, although the next-generation image coding technology has been developed and requirements for an UHD broadcast service are rapidly increasing, a related art UHD broadcast service is transmitted over only a dedicated broadcast network, causing the inconvenience of a user of a mobile terminal when the user desires to receive the UHD broadcast service such as HD, 4K-UHD, 8K-UHD, etc.

Moreover, relevant technology is being developed for preferentially gaining next-generation broadcast technology all over the world, and high efficiency broadcast service technology for providing a broadcast service in a fixed environment and a mobile environment is needed.

SUMMARY OF CERTAIN INVENTIVE ASPECTS

One inventive aspect relates to a broadcast communication fusion system which codes various kinds of image data including ultra-high definition (UHD) image data and additional data of the image data by using a scalable video coding scheme based on high efficiency video coding (HEVC) and transmits the coded image data and additional data to a terminal by using at least one of a broadcast network and a communication network.

An SHVC-based ultra-high definition (UHD) image data transmission system according to an aspect of the present invention includes an image data collector configured to collect image data, including data of an UHD image, and additional data of the image data, an image data coder configured to code the image data and the additional data of the image data by using a high efficiency video coding (HEVC)-based scalable video coding scheme, and an image data transmitter configured to transmit at least one of a portion of the coded image data and the coded additional data to a terminal by using a communication network.

An SHVC-based UHD image data reception system according to another aspect of the present invention includes an image data receiver configured to receive image data coded based on an HEVC-based scalable coding scheme over a broadcast network and receive a portion of the image data or additional data of the image data over a communication network and an image output unit configured to decode the image data and the additional data and output an image where the coded image data and additional data are combined with each other.

According to embodiments, a burden of a broadcast network is reduced by divisionally transmitting image data and additional data, which are transmitted over a broadcast network in the related art, to a terminal over the broadcast network or a communication network.

Moreover, a user of a terminal additionally receives additional data over the communication network, thereby selectively watching a broadcast service which the user desires to watch.

The effects of the described technology are not limited to the aforesaid, but other effects not described herein will be clearly understood by those skilled in the art from descriptions below.

BRIEF DESCRIPTION OF THE DRAWINGS

FIG. 3 is a diagram illustrating transmission and reception of 3D image data according to an embodiment of the present invention.

DETAILED DESCRIPTION OF CERTAIN INVENTIVE EMBODIMENTS

The advantages, features and aspects of the described technology will become apparent from the following description of the embodiments with reference to the accompanying drawings, which is set forth hereinafter.

The described technology may, however, be embodied in different forms should not be construed as limited to the embodiments set forth herein. Rather, these embodiments are provided so that this disclosure will be thorough and complete, and will fully convey the scope of the present invention to those skilled in the art.

The terms used herein are for the purpose of describing particular embodiments only and are not intended to be limiting of example embodiments. As used herein, the singular forms "a," "an" and "the" are intended to include the plural forms as well, unless the context clearly indicates otherwise. It will be further understood that the terms "comprise" and/or "comprising," when used in this specification, specify the presence of stated features, integers, steps, operations, elements, and/or components, but do not preclude the presence or addition of one or more other features, integers, steps, operations, elements, components, and/or groups thereof.

Figure 1:
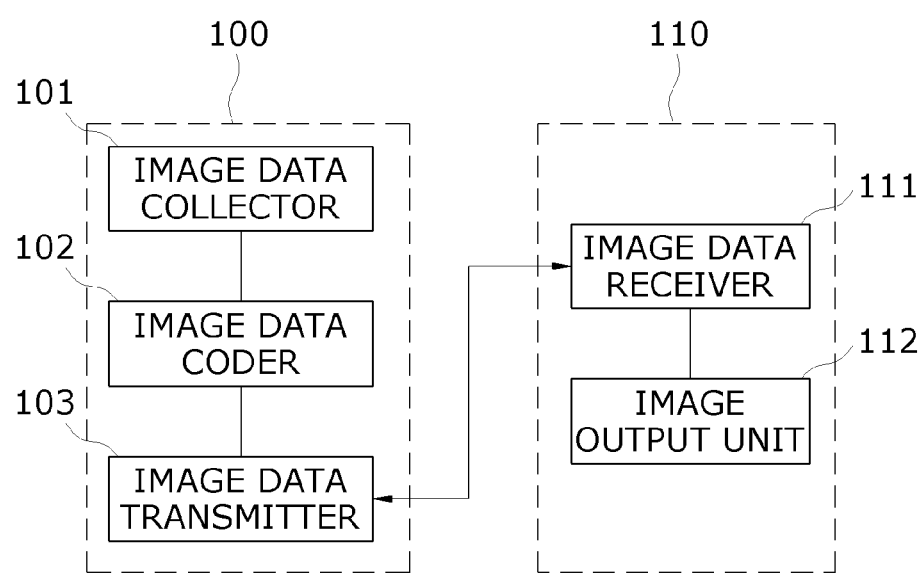
FIG. 1 is a block diagram illustrating a configuration of a transmission system for transmitting scalable high efficiency video coding (SHVC)-based ultra-high definition (UHD) image data and a reception system for receiving the SHVC-based UHD image data, according to an embodiment of the present invention.

FIG. 1 is a block diagram illustrating a configuration of a transmission system for transmitting scalable high efficiency video coding (SHVC)-based ultra-high definition (UHD) image data and a reception system for receiving the SHVC-based UHD image data, according to an embodiment of the present invention.

As illustrated in FIG. 1, an SHVC-based UHD image data transmission and reception system 100 according to an embodiment of the present invention includes an image data collector 101 an image data coder 102, and an image data transmitter 103, and the SHVC-based UHD image data transmission and reception system 100 includes an image data receiver 111 and an image output unit 112.

The image data collector 101 of the SHVC-based UHD image data transmission and reception system 100 collects UHD image data, such as 4K-UHD image data and 8K-UHD image data, and additional data of the UHD image data.

Here, the UHD image data denotes UHD image data such as 4K-UHD image data (4K: 3,840×2,160 ppi) for providing an image four times sharper than an HD image and 8K-UHD image data (8K: 7,680×4,320 ppi) for providing an image eight times sharper than the HD image.

Moreover, the image data collector 101 secures HD image data, full HD image data, 3D image data, and additional data of image data.

The image data coder 102 codes the image data and the additional data secured through the image data collector 101 by using an SHVC coding scheme.

Here, the SHVC coding scheme is a compression scheme which shows coding efficiency corresponding to about 35% of H.264 scalable video coding (AVC) of the related art, and denotes an HEVC-based scalable video coding scheme that generates a complex bitstream where various kinds of image data are included in one bitstream.

As described above, a complex bitstream is generated from various kinds of image data, thereby providing adaptable image data with one bitstream in various network environments or dissimilar terminal environments.

The image data transmitter 103 transmits the image data coded by the image data coder 102 to a terminal over a broadcast network and transmits the additional data to the terminal over a communication network.

In another embodiment, the image data transmitter 103 may transmit coded 4K-UHD image data to the terminal over the broadcast network and may transmit a portion of coded 8K-UHD image data to the terminal over the communication network.

In another embodiment, the image data transmitter 103 may transmit a portion of the coded image data (for example, a portion of 3D image data) to the terminal over the broadcast network and may transmit the other of the coded image data (for example, the other of the 3D image data) to the terminal over the communication network.

As described above, a burden of the broadcast network is reduced by divisionally transmitting image data and additional data, which are transmitted over the broadcast network in the related art, to the terminal over the broadcast network or the communication network.

The image data receiver 111 of the SHVC-based UHD image data transmission and reception system 100 receives various kinds of image data and additional data of the image data which have been coded in an HEVC-based scalable video coding scheme (an SHVC coding scheme).

In an embodiment, the image data receiver 111 receives image data, including at least one of coded 4K-UHD image data, 8K-UHD image data, HD image data, full HD image data, and 3D image data, over the broadcast network and receives additional data over the communication network.

In another embodiment, the image data receiver 111 receives the coded 4K-UHD image data over the broadcast network and receives a portion of the 8K-UHD image data over the communication network.

In another embodiment, the image data receiver 111 receives a portion (for example, a 3D left image) of the coded 3D image data over the broadcast network and receives the other (for example, a 3D right image) of the coded 3D image data over the communication network.

The image output unit 112 decodes the image data and the additional data received through the image data receiver 111 and combines the decoded image data and additional data to output a combined image.

That is, when a viewer desires to receive an 8K-UHD image service in the middle of receiving the 4K-UHD image data over the broadcast network, 8K-UHD additional data may be request over the communication network, and the 8K-UHD additional data defined in SVC may be received over the communication network, thereby providing an 8K-UHD broadcast service where the received 8K-UHD additional data and a 4K-UHD image service are combine with each other.

In another embodiment, the image output unit 112 combines the 4K-UHD image data, received from the image data receiver 111 over the broadcast network, with a portion of the 8K-UHD image data received over the communication network and outputs a combined 8K-UHD image by using a display device.

In another embodiment, the image output unit 112 combines 3D image data divisionally received in different communication schemes through the image data receiver 111 and outputs a combined 3D image by using the display device.

Hereinafter, an embodiment for transmitting and receiving image data will be described in detail with reference to FIGS. 2 and 3.

Figure 2:
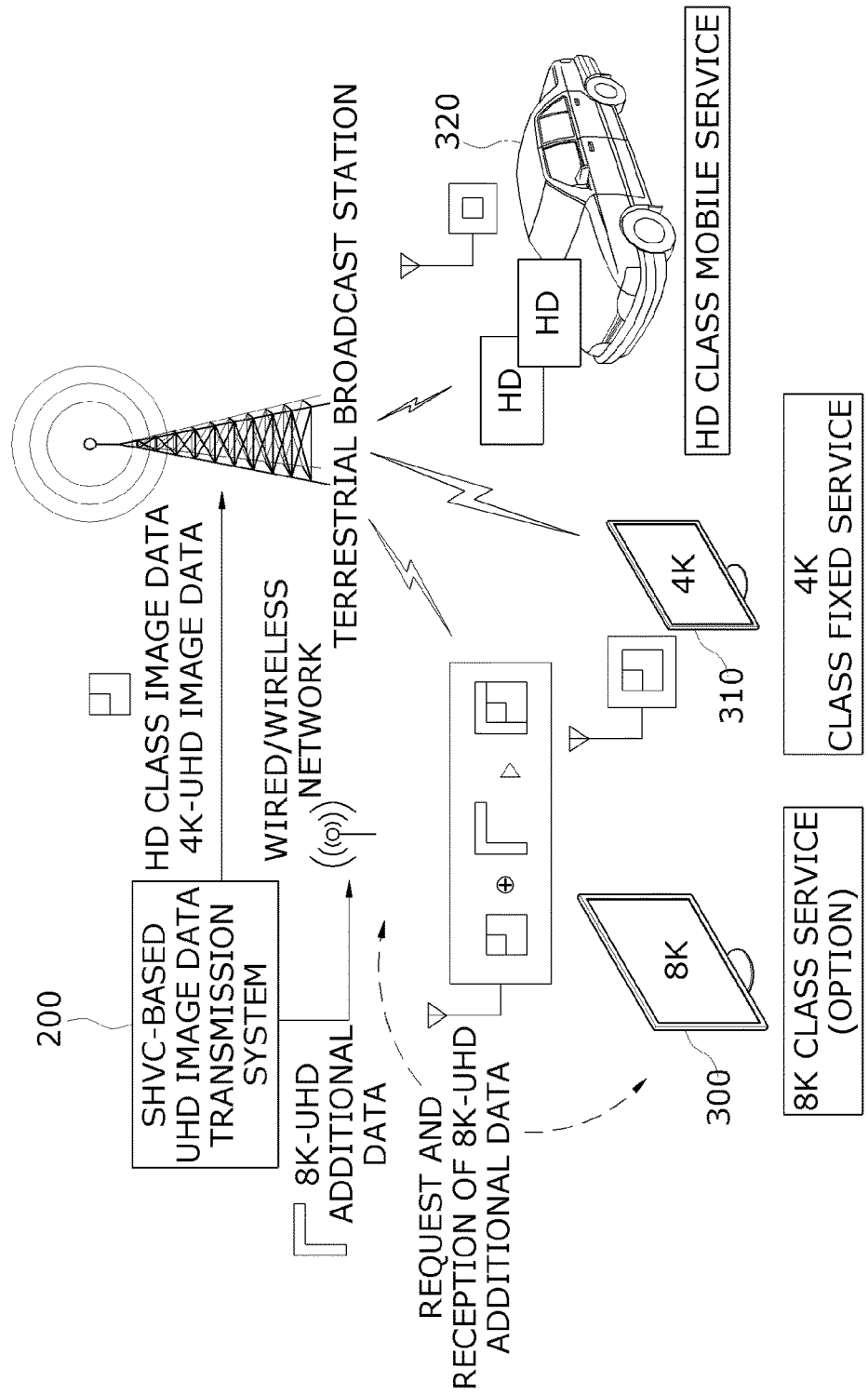
FIG. 2 is a diagram illustrating transmission and reception of UHD image data, HD image data, and full HD image data according to an embodiment of the present invention.

FIG. 2 is a diagram illustrating an embodiment for transmitting and receiving UHD image data, HD image data, and full HD image data according to an embodiment of the present invention.

As illustrated in FIG. 2, an SHVC-based UHD image data transmission system 200 codes UHD image data, HD image data, and full HD image data in an SHVC coding scheme and transmits the coded image data to a mobile terminal or a fixed terminal through a terrestrial single channel.

Moreover, the SHVC-based UHD image data transmission system 200 transmits additional data of the UHD image data, the HD image data, and the full HD image data or a portion of image data to the mobile terminal or the fixed terminal by using a wired/wireless communication network instead of the terrestrial single channel.

In this case, an 8K-UHD TV 300 which is the fixed terminal may receive 4K-UHD image data over the broadcast network from the SHVC-based UHD image data transmission system 200 and may receive, as an additional service, additional data for reproducing an 8K-UHD image over the communication network, thereby providing the 8K-UHD image.

Alternatively, the 8K-UHD TV 300 which is the fixed terminal may receive 4K-UHD image data over the broadcast network to provide 4K-UHD broadcast, and when desired by a user, the 8K-UHD TV 300 may receive a portion of an 8K image as an additional service over the broadcast network (Internet streaming) to provide an 8K-UHD image. Therefore, the 8K-UHD TV 300 may combine a 4K image, received over the broadcast network, with a portion of an 8K image received through streaming over the communication network to provide the 8K image to the user.

Alternatively, a mobile terminal 320 of a user equipped in a vehicle may receive HD class image data from the SHVC-based UHD image data transmission system 200 and may decode and provide the HD class image data.

FIG. 3 is a diagram illustrating an embodiment for transmitting and receiving 3D image data according to an embodiment of the present invention.

As illustrated in FIG. 3, an SHVC-based UHD image data transmission system 400 transmits a portion (for example, 4K 3D right image data) of coded 3D image data to a terminal over the broadcast network and transmits the other (for example, 4K 3D left image data) except the portion of the 3D image data to the terminal over the communication network.

Therefore, a user may receive the 4K 3D right image data by using a conventional 4K-UHD TV to watch a 4K image 500 corresponding to the received 4K 3D right image data, and when the user desires to watch a complete 3D UHD image, the user may additionally request the 4K 3D left image data from an SHVC-based UHD image data transmission system over the communication network and may receive the 4K 3D left image data, thereby watching a 4K UHD 3D image 510.

Figure 4A:
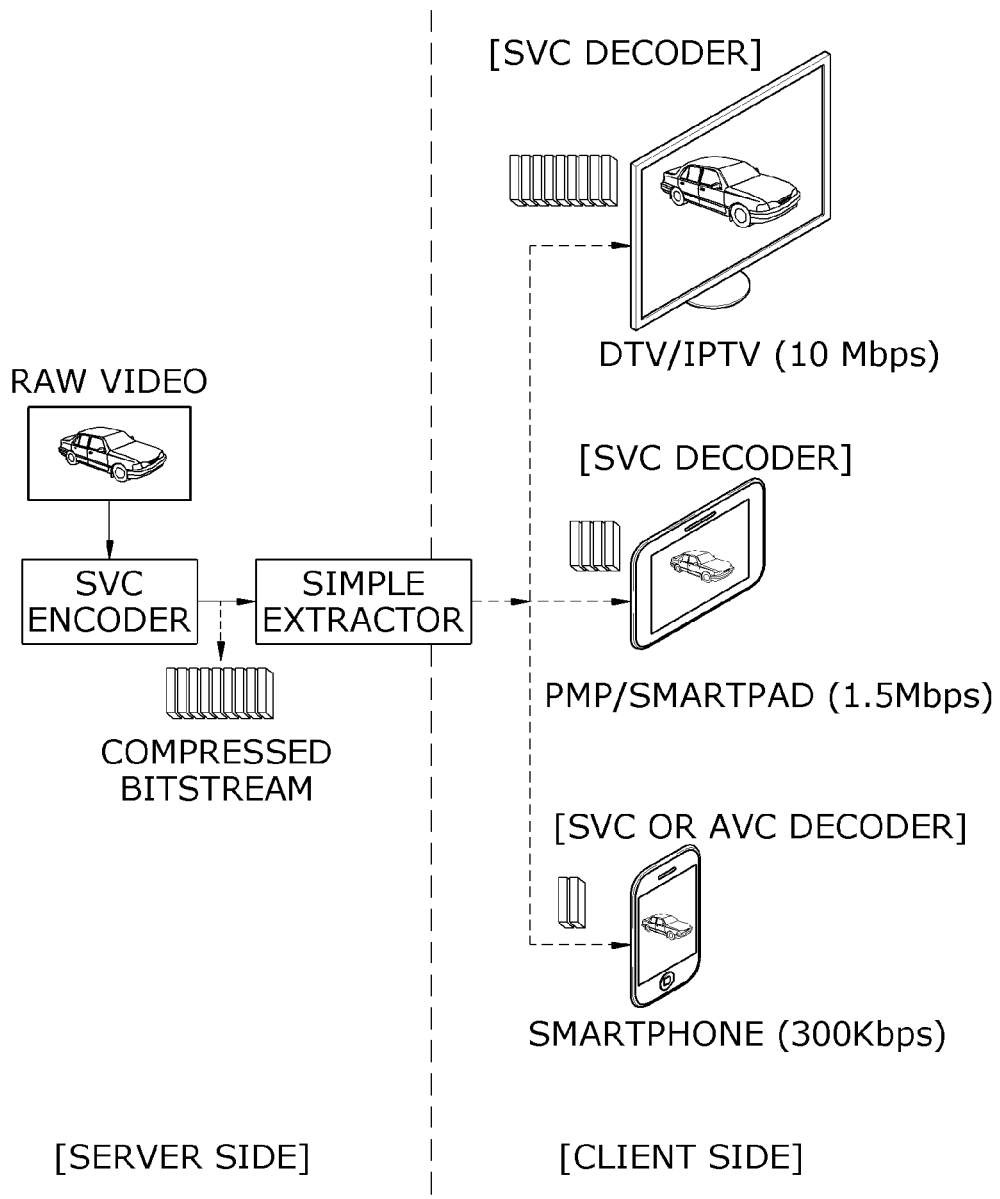
FIG. 4A is a diagram illustrating a transmission and reception structure of image data of the related art.
Figure 4B:
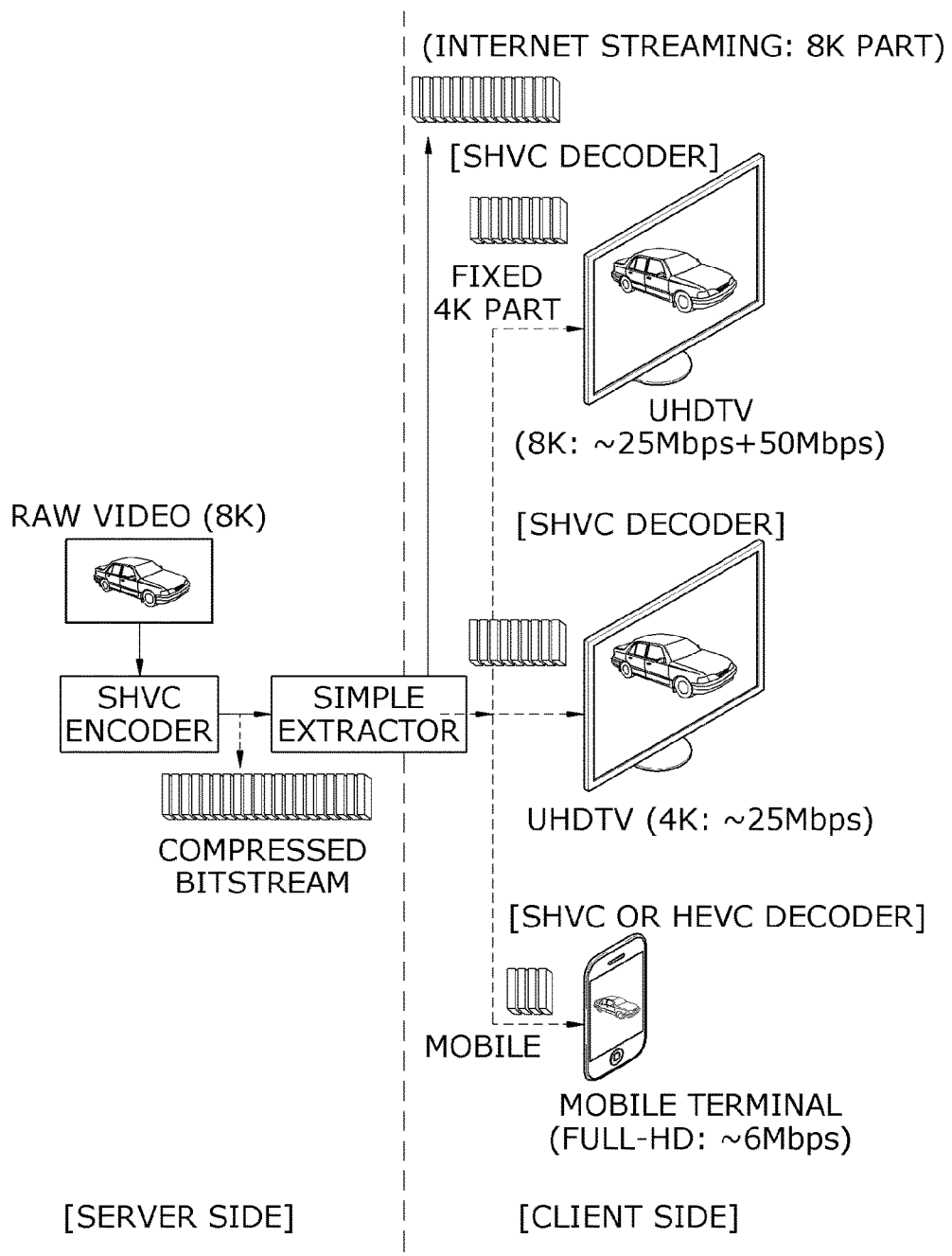
FIG. 4B is a diagram illustrating a transmission and reception structure of image data of the present invention.

FIG. 4A is a diagram illustrating a transmission and reception structure of image data of the related art, and FIG. 4B is a diagram illustrating a transmission and reception structure of image data of the present invention.

As illustrated in FIG. 4A, the transmission and reception structure of image data of the related art has a structure where image data coded by using a scalable video coding scheme (SVC) is transmitted to a fixed terminal or a mobile terminal over the broadcast network.

As illustrated in FIG. 4B, the transmission and reception structure of image data of the present invention has a structure where 8K-UHD image data and 4K-UHD image data coded by fundamentally using SHVC (an HEVC-based scalable video coding scheme) are transmitted to the fixed terminal or the mobile terminal over the broadcast network, and when there is a request of a user, a portion of the 8K-UHD image data is additionally transmitted to the fixed terminal selectively.

In this case, the fixed terminal which has received only the 4K-UHD image data may provide an 4K-UHD image, and when selectively and additionally transmitting a portion of the 8K-UHD image data, the fixed terminal may provide an 8K-UHD image where the 4K-UHD image data and the portion of the 8K-UHD image data are combined with each other.

On the other hand, the mobile terminal may decode received full HD image data by using only an HEVC decoding function to provide a full HD image.

The described technology divisionally provides an UHD broadcast service, which is provided over the conventional broadcast network, over the broadcast network and the communication network, thereby reducing a transmission burden of the broadcast network. Also, by transmitting separate image data over the communication network, the present invention may be developed in a structure where a paid service is capable of being provided through a cooperation of the broadcast network and the communication network.

Moreover, a user may select and watch only a desired image without receiving all of undesired massive UHD image data, or only when necessary, the user may receive the UHD image data by using a separate data channel, thereby flexibly responding to various viewing patterns of the user.

Furthermore, a reception platform where the broadcast network and the communication network are fused is applied to a smart device, a bidirectional set-top box, and a smart TV, and thus, it is possible to strengthen the competitiveness of products and create a newly added value in relevant market.

While the inventive technology has been particularly shown and described with reference to embodiments thereof, it will be understood by those of ordinary skill in the art that various changes in form and details may be made therein without departing from the spirit and scope of the invention as defined by the appended claims. The embodiments should be considered in descriptive sense only and not for purposes of limitation. Therefore, the scope of the invention is defined not by the detailed description but by the appended claims, and all differences within the scope will be construed as being included in the present invention.

What is claimed is:

1. A scalable high efficiency video coding (SHVC)-based ultra-high definition (UHD) image data transmission system comprising:
   an image data coder configured to code a raw video of 8K-UHD into a bitstream by using a high efficiency video coding (HEVC)-based scalable video coding scheme; and
   an image data transmitter configured to transmit a 4K-UHD image data of the bitstream to a broadcast station to broadcast the 4K-UHD image data to a user device via a broadcast network,
   wherein the SHVC based UHD image data transmission system is configured to:
   receive, from the user device, a request for additional 8K-UHD image data via a two-way data communication network that is separate from the broadcast network, and
   in response to the request received via the two-way data communication network, transmit, through the image data transmitter, the additional 8K-UHD image data of the bitstream via the two-way data communication network, the additional 8K-UHD image data configured to be combined with the 4K-UHD image data in order for the user device to construct an 8K-UHD version of the raw video using the 4K-UHD image data received via the broadcast network and the additional 8K-UHD image data received via the two-way data communication network.

2. The SHVC-based UHD image data transmission system of claim 1 further comprising an image data collector configured to collect UHD image data including at least one of 4K-UHD image data and 8K-UHD image data, and at least one of HD image data, full HD image data, and 3D image data.

3. A scalable high efficiency video coding (SHVC)-based ultra-high definition (UHD) image data reception system comprising:
   an image data receiver configured to:
   receive a 4K-UHD image data from a broadcast station via a broadcast network, the 4K-UHD image data configured to be generated from a raw video of 8K-UHD using a high efficiency video coding (HEVC)-based scalable coding scheme,
   send a request for additional 8K-UHD image data to an SHVC-based UHD image data transmission system via a two-way data communication network that is separate from the broadcast network, and
   receive the additional 8K-UHD image data from the SHVC-based UHD image data transmission system via the two-way data communication network, the additional 8K-UHD image data configured to be generated from the raw video using the HEVC-based scalable coding scheme; and
   an image output unit configured to combine the 4K-UHD image data received via the broadcast network and the additional 8K-UHD image data received via the two-way data communication network to output an 8K-UHD version of the raw video.

4. The SHVC-based UHD image data reception system of claim 3, wherein the image data receiver is configured to receive a 3D left image over the broadcast network and the communication network.

* * * * *